US012630097B2

(12) United States Patent
Saito et al.

(10) Patent No.: US 12,630,097 B2
(45) Date of Patent: May 19, 2026

(54) ARTICLE-HOLDING COMPONENT

(71) Applicant: HAYASHI TELEMPU CORPORATION, Nagoya (JP)

(72) Inventors: Akira Saito, Nagoya (JP); Takuto Mase, Nagoya (JP)

(73) Assignee: HAYASHI TELEMPU CORPORATION, Nagoya (JP)

( * ) Notice: Subject to any disclaimer, the term of this patent is extended or adjusted under 35 U.S.C. 154(b) by 143 days.

(21) Appl. No.: 18/499,017

(22) Filed: Oct. 31, 2023

(65) Prior Publication Data

US 2024/0166138 A1 May 23, 2024

(30) Foreign Application Priority Data

Nov. 18, 2022 (JP) ................................. 2022-184679

(51) Int. Cl.
 *B60R 11/00* (2006.01)

(52) U.S. Cl.
 CPC ....... *B60R 11/00* (2013.01); *B60R 2011/0047* (2013.01); *B60R 2011/005* (2013.01)

(58) Field of Classification Search
 CPC ..... B60R 2011/0005; B60R 2011/0043; B60R 2011/0045; B60R 2011/0047; B60R 2011/0075
 USPC ......................... 224/926, 567, 571, 929, 915
 See application file for complete search history.

(56) References Cited

U.S. PATENT DOCUMENTS

| | | | | |
|---|---|---|---|---|
| 3,081,126 A | * | 3/1963 | Theberge | B60R 7/12 224/571 |
| 4,378,888 A | * | 4/1983 | Reed | A47G 25/12 224/400 |
| 5,169,097 A | * | 12/1992 | Yasukawa | B60R 11/02 312/7.1 |
| 5,465,891 A | * | 11/1995 | Bridges | A47G 19/2261 220/636 |
| 5,769,294 A | * | 6/1998 | Heinz | B60R 7/02 224/927 |
| 5,800,004 A | * | 9/1998 | Ackeret | B60R 7/12 296/37.13 |
| 5,897,041 A | * | 4/1999 | Ney | B60N 3/101 248/311.2 |
| 7,194,087 B2 | * | 3/2007 | Luginbill | H04M 1/04 455/90.3 |
| 7,770,748 B2 | * | 8/2010 | Elliott | A47G 19/2205 215/393 |
| 8,511,733 B2 | * | 8/2013 | Blackmore | B60R 7/04 224/544 |

(Continued)

FOREIGN PATENT DOCUMENTS

| | | | | | |
|---|---|---|---|---|---|
| CN | 110696734 A | * | 1/2020 | ......... | B60R 11/0252 |
| CN | 105083146 B | * | 10/2020 | ......... | B60R 11/0241 |

(Continued)

*Primary Examiner* — Justin M Larson
(74) *Attorney, Agent, or Firm* — Foley & Lardner LLP

(57) ABSTRACT

An article-holding component is provided for holding an article. The article-holding component comprises a cylindrical part made of a cylindrical material, wherein: a holding part that engages with the article is formed on the inner surface of the cylindrical part to enable holding the article; the article-holding component is provided in a first part of an interior material of a vehicle; and the first part is covered with a second part of the vehicle different from the interior material.

4 Claims, 4 Drawing Sheets

(56)                   References Cited

U.S. PATENT DOCUMENTS

| 8,979,160 | B1 * | 3/2015 | Pericak | .................. | E05B 83/30 |
| | | | | | 224/544 |
| 9,016,748 | B1 * | 4/2015 | Ardigo | ................... | B60R 7/046 |
| | | | | | 296/37.13 |
| 10,576,905 | B1 * | 3/2020 | MacNeil | .............. | H04B 1/3877 |
| 10,596,946 | B1 * | 3/2020 | Huntley | ................ | B60N 3/103 |
| 10,773,657 | B2 * | 9/2020 | Palaka | .................. | H02J 7/0044 |
| 10,870,396 | B2 * | 12/2020 | Tena Han | ................. | B60R 7/12 |
| 12,097,792 | B2 * | 9/2024 | Tuttle | ..................... | B60N 3/103 |
| 2007/0241582 | A1 * | 10/2007 | McKeever | ............... | B60R 7/12 |
| | | | | | 296/37.12 |
| 2020/0317134 | A1 | 10/2020 | Flynn et al. | | |

FOREIGN PATENT DOCUMENTS

| DE | 10 2012 214 504 | A1 | | 3/2013 | | |
| FR | 2940941 | A1 | * | 7/2010 | ............. | A47D 5/003 |
| FR | 2991934 | A1 | * | 12/2013 | ......... | B60R 11/0241 |
| JP | H04-117167 | U | | 4/1992 | | |
| JP | H10-278673 | A | | 10/1998 | | |
| JP | 2011-020632 | A | | 2/2011 | | |
| JP | 2012-121420 | A | | 6/2012 | | |

* cited by examiner

A—A

51

1(11)

A__A

ARTICLE-HOLDING COMPONENT

CROSS-REFERENCE TO RELATED APPLICATION

This application claims priority to Japanese Patent Application No. 2022-184679, filed on Nov. 18, 2022, the disclosure of which is hereby incorporated by reference in its entirety.

TECHNICAL FIELD

The present invention relates to an article-holding component for holding articles used in a vehicle.

BACKGROUND ART

A vehicle such as a passenger car is provided with a luggage compartment such as trunk space for storing fixtures and luggage of a user and is also provided with a storage section for storing various articles used by the user.

For example, Japanese Patent Application Laid-Open No. 10 (1998)-278673 (hereinafter referred to as Patent Document 1) describes a detachable room lamp (interior light) that can be detachably attached to the ceiling of the vehicle and can be used as a flashlight or emergency light.

The detachable room lamp described in the above-mentioned Patent Document 1 is configured to emit light using the power of a built-in battery, so connectors and wiring for supplying power to the battery must be available in the ceiling in the vehicle when the room lamp is attached. As a result, the parts cost and the work cost for wiring will increase.

In addition, when the room lamp is attached, the room lamp will stand out and therefore detract from the appearance of the designed surface of the ceiling. On the other hand, even when the room lamp is detached, the appearance of the designed surface of the ceiling will be marred by the appearance of a recess, a connector, and the like in the ceiling.

Patent Document 1 proposes a configuration and shape of a detachable room lamp and a configuration and shape of the ceiling to which the room lamp is attached, and this configuration is not intended for the attachment of other articles to the interior of the vehicle.

SUMMARY OF THE INVENTION

The present invention has been made to solve the problems of the background art as described above. An object of the present invention is to provide an article-holding component that can be used for holding various articles without detracting from the appearance of the interior of a vehicle while also reducing increase in cost.

To accomplish the above objects, the present invention provides an article-holding component for holding an article comprising a cylindrical part made of a cylindrical material, wherein:

a holding part that engages with the article is formed on the inner surface of the cylindrical part to enable holding the article;

the article-holding component is provided in a first part of an interior material of a vehicle; and the first part is covered with a second part of the vehicle different from the interior material.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE PREFERRED EMBODIMENT

Next, the present invention will be described with reference to the drawings.

Figure 1:
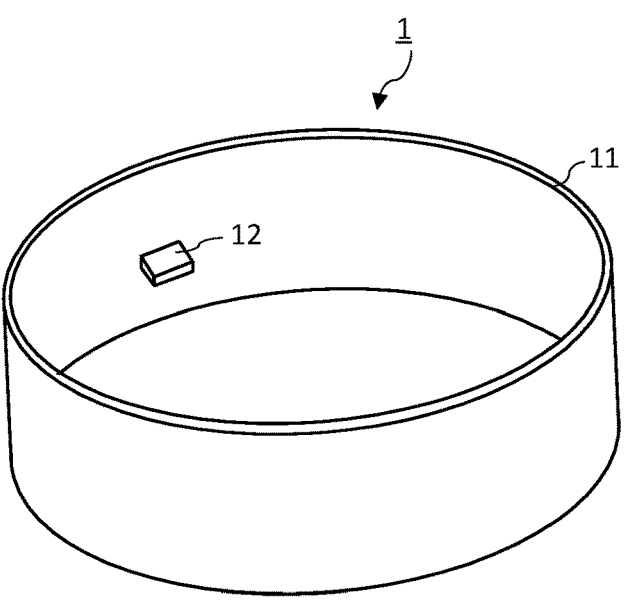
FIG. 1 is a perspective view showing a configuration of an article-holding component of the present invention.
Figure 2:
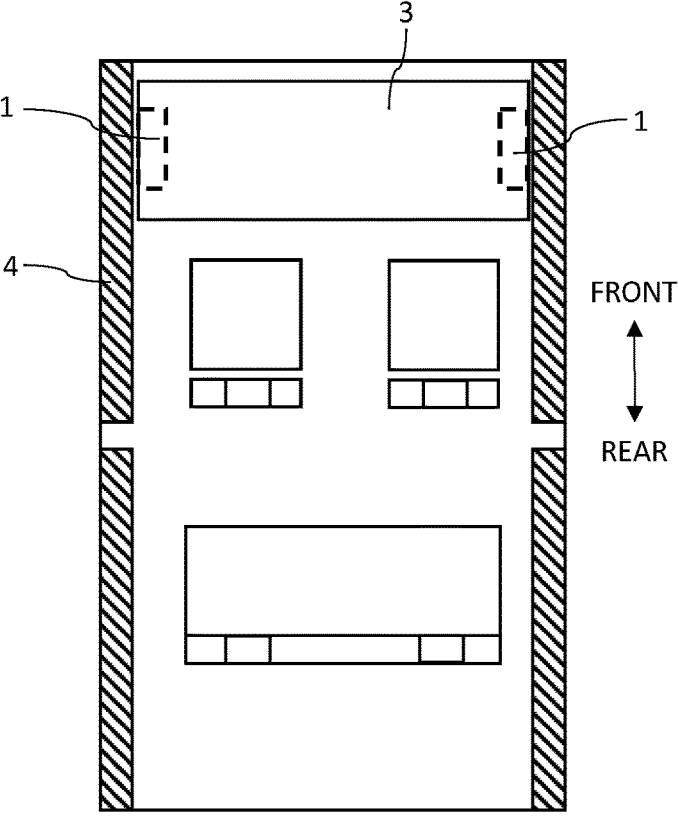
FIG. 2 is a schematic diagram of a vehicle showing an example of an attachment position of the article-holding component shown in FIG. 1.
Figure 3:
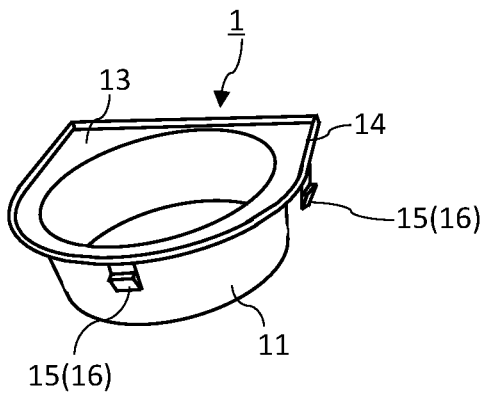
FIG. 3 is a perspective view showing another configuration of the article-holding component of the present invention.
Figure 4:
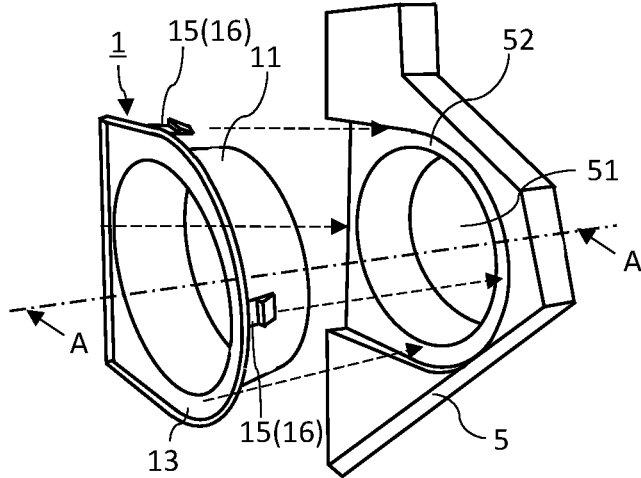
FIG. 4 is a perspective view showing where the article-holding component shown in FIG. 3 is attached to an interior material.
Figure 5:
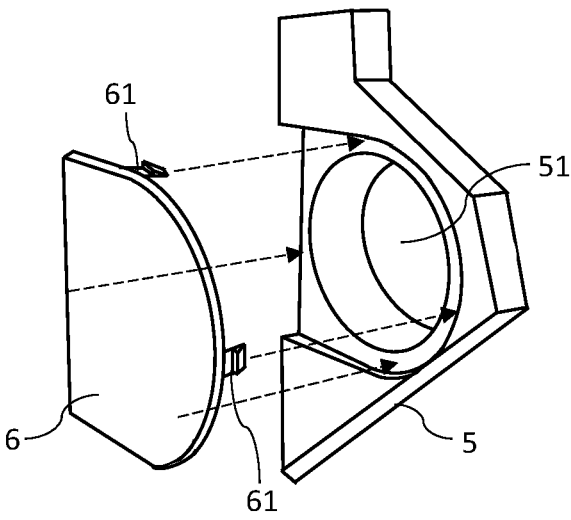
FIG. 5 is a perspective view showing a configuration of a cover part.
Figure 6:
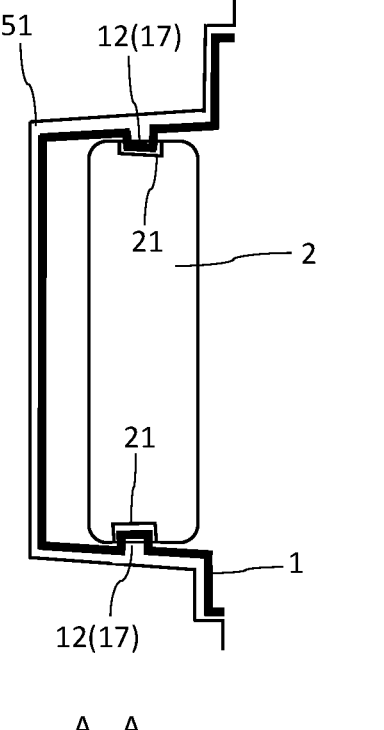
FIG. 6 is a side sectional view showing where the article is attached to the article-holding component shown in FIG. 3.
Figure 7:
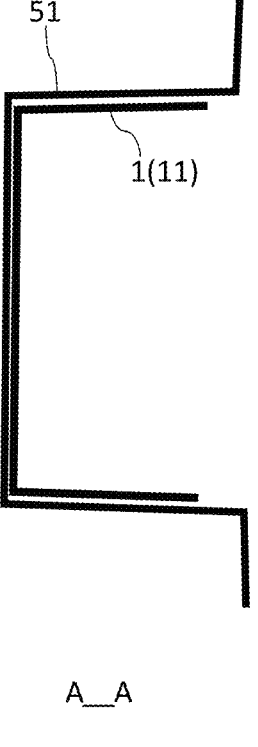
FIG. 7 is a side cross-sectional view showing an example of the positional relationship between the open end of the cylindrical part and the open end of the recess shown in FIG. 1.

FIG. 1 is a perspective view showing a configuration of an article-holding component of the present invention, and FIG. 2 is a schematic diagram of a vehicle showing an example of an attachment position of the article-holding component shown in FIG. 1. FIG. 3 is a perspective view showing another configuration of the article-holding component of the present invention, and FIG. 4 is a perspective view showing where the article-holding component shown in FIG. 3 is attached to an interior material. FIG. 5 is a perspective view showing a configuration of a cover part, and FIG. 6 is a side sectional view showing where the article is attached to the article-holding component shown in FIG. 3. FIG. 7 is a side cross-sectional view showing an example of the positional relationship between the open end of the cylindrical part and the open end of the recessed part shown in FIG. 1.

FIG. 2 schematically shows the interior of the vehicle as viewed downward from the ceiling of the vehicle. FRONT and REAR shown in FIG. 2 indicate the front and rear of the vehicle. FIG. 6 schematically shows a cross section taken along line A-A shown in FIG. 4 and shows article-holding component 1, article 2, and recessed part 51, which will be described later.

FIG. 7 schematically shows a cross section of cylindrical part 11 and recessed part 51 of article-holding component 1, to be described, when cut at a position corresponding to line A-A shown in FIG. 4. FIG. 7 shows an example in which article-holding component 1 without flange 13, which will be described later, is housed in recessed part 51.

FIGS. 1 to 7 schematically show each constituent element of the present invention and are not intended to accurately represent the size, shape, structure, or position of each constituent element.

As shown in FIG. 1, article-holding component 1 of the present invention comprises cylindrical part 11 made of a cylindrical material and is a configuration in which holding part 12 is formed to allow article 2 to be held on the inner surface of cylindrical part 11. Article 2 is housed inside cylindrical part 11 of article-holding component 1 and is held by holding part 12. Cylindrical part 11 may be a cylindrical material with one end closed and the other end open or may be a cylindrical material with both ends open. FIGS. 6 and 7, which will be described later, show an example in which article-holding component 1 comprises cylindrical part 11 made of a cylindrical material with one end closed and the other end open. Article-holding component 1 shown in FIG. 1 is provided in a part (first part) of an interior material of a vehicle and is covered with a part (second part) of another interior material of the vehicle.

Examples of article 2 that is held by article-holding component 1 of the present invention include a lamp, a coin case, and a tool. Article 2 to be held is not limited to these examples, and any article may be used on the condition that it is formed in a common shape that can be held by article-holding component 1.

FIG. 1 shows an example in which cylindrical part 11 is substantially cylindrical. FIGS. 2 to 4, 6, and 7, which will be described later, also show examples in which cylindrical part 11 is substantially cylindrical. Cylindrical part 11 may also have a polygonal cylindrical shape or an elliptical cylindrical shape having three or more corners. Cylindrical part 11 may have any shape and size on the condition that each article 2 to be held having a common shape and size can be housed therein. The shape and size of cylindrical part 11 may be determined in consideration of the shape and size of the interior material of the vehicle in which article-holding component 1 is provided.

For example, as shown in FIG. 2, article-holding component 1 shown in FIG. 1 is detachably attached to the side surface of instrument panel 3 provided in front of the passenger. In this case, article-holding component 1 is covered by closed door 4.

In general, the side surface of instrument panel 3 of a vehicle is dead space that is hidden when door 4 is closed and is not effectively utilized. Another example that can also be considered as dead space is a portion of the side wall of the passenger compartment that is hidden by the side surface of the backrest of the passenger seat when a passenger is seated and that is visible when the backrest is reclined. Arranging article-holding component 1 of the present invention in dead space that is covered by another movable part such as door 4 or a seat enables effective utilization of the dead space.

Also, relatively small articles 2 such as lamps and coin cases are often placed in the pocket of door 4, inside the glove box, or in the luggage compartment when not in use. In such a case, article 2 and the part in which article 2 is placed may contact each other due to vibrations or the like during operation of the vehicle, and this contact may cause abnormal noise or may even cause damage to article 2 or the part in which article 2 is placed. Since article-holding component 1 of the present invention is configured to hold article 2 inside cylindrical part 11, there will be no noise or damage to article 2 or the part in which article 2 is placed.

Furthermore, the detachable room lamp described in Patent Document 1 may, for example, detach from the ceiling in the event of an accident and cause injury to a passenger. Article-holding component 1 of the present invention is less likely to detach even in the event of an accident because the part at which article-holding component 1 is provided is further covered by another part of the vehicle. If article-holding component 1 is provided on the side surface of instrument panel 3, article-holding component 1 is attached substantially parallel to the direction of width of the vehicle and thus in a direction perpendicular to front-rear direction of the vehicle. Therefore, even should article-holding component 1 detach in the event of an accident, the possibility of causing injury to a passenger is reduced.

As shown in FIG. 3, the open end of cylindrical part 11 of article-holding component 1 may comprise plate-like flange 13 that projects in a direction perpendicular to the wall surface of cylindrical part 11. Projecting part 14 that is parallel to the wall surface of cylindrical part 11 is formed at the outer peripheral end of flange 13. The shape of flange 13 may be the same as or different from the shape of the opening of cylindrical part 11. FIG. 3 shows an example in which the shape of the opening of cylindrical part 11 and the shape of flange 13 are different.

As shown in FIG. 4, article-holding component 1 can be housed in recessed part 51, which is formed in a part of interior material 5 at which article-holding component 1 is to be provided. FIG. 4 shows an example in which article-holding component 1 having flange 13 on cylindrical part 11 can be housed in recessed part 51. In FIGS. 4 and 5, interior material 5 (to be described later) merely represents an example. Interior material 5 is not limited to the shape shown in FIGS. 4 and 5.

In a structure in which cylindrical part 11 includes flange 13, contact part 52 that has a recessed form having substantially the same shape as flange 13 is formed on the opening side of recessed part 51 so that flange 13 is positioned deeper than the open end of recessed part 51 when article-holding component 1 is attached. Article-holding component 1 comprises attachment parts 15 on the outer surface of cylindrical part 11 that engage with recessed part 51 of interior material 5, and attachment parts 15 allow attachment and detachment. Attachment parts 15 preferably engage recessed parts 51 at a plurality of positions.

As shown in FIG. 5, cover part 6 may be attached to recessed part 51 to cover recessed part 51 when article-holding component 1 is not attached.

As shown in FIGS. 3 and 4, attachment parts 15 of cylindrical part 11 comprise, for example, claw parts 16. Article-holding component 1 is attached by inserting claw parts 16 into holes (not shown) provided around recessed part 51 of interior material 5.

FIGS. 3 and 4 show a configuration in which a plurality of claw parts 16 is provided on flange 13 of cylindrical part 11. In the case of cylindrical part 11 shown in FIG. 1 that lacks flange 13, claw parts 16 may be provided on the outer wall surface of the open end of cylindrical part 11. The shape and positions of claw parts (first claw parts) 16 of attachment parts 15 may be the same as the shape and positions of claw parts (second claw parts) 61 provided on cover part 6 shown in FIG. 5. Making the shape and positions of attachment parts (first claw parts) 15 of article-holding component 1 the same as the shape and positions of claw parts (second claw parts) 61 of cover part 6 simplifies the structure for attaching the cover part 6 and article-holding component 1 to recessed part 51.

Holding part 12 formed inside cylindrical part 11 of article-holding component 1 comprises two or more convex parts 17 that project toward the inside of cylindrical part 11, as shown in FIG. 6. Article 2 is provided with grooves 21 that engage with convex parts 17, and convex parts 17 and grooves 21 are engaged by rotating article 2 inside cylindrical part 11. Grooves 21 may be formed, for example, in an L-shape or T-shape having both grooves that are parallel to the attaching and detaching direction of article 2 from the side edge of article 2 and grooves that are perpendicular to the attaching and detaching direction of article 2.

In such a configuration, article 2 can be easily attached to and detached from article-holding component 1 by simply rotating article 2 within cylindrical part 11 of article-holding component 1. Furthermore, by making the shapes of convex parts 17 and grooves 21 common to articles 2, various articles 2 can be held by one article-holding component 1.

When the open end of article-holding component 1 projects from the open end of recessed part 51 provided in interior material 5, there is a potential for damage to article-holding component 1 and article 2 if the projecting part contacts door 4 or the like that covers article-holding component 1.

Therefore, as shown in FIG. 7, the open end of cylindrical part 11 of article-holding component 1 needs to be positioned deeper than the open end of recessed part 51. However, if the open end of cylindrical part 11 is positioned deeper than the open end of recessed part 51, the difference in level between the open end of cylindrical part 11 and the open end of recessed part 51 may become conspicuous and detract from the appearance. Therefore, it is desirable that the open end of cylindrical part 11 be flush with the open end of recessed part 51. In the structure in which cylindrical part 11 includes flange 13, contact part 52 on the opening side of flange 13 and recessed part 51 should be formed such that the top of projecting part 14 of flange 13 is flush with the opening end of recessed part 51.

Article-holding component 1 of the present invention has a simple structure comprising cylindrical part 11, and recessed part 51 provided in interior material 5 to which article-holding component 1 is attached also has a simple structure. Increase in processing cost or the like attendant to providing article-holding component 1 is therefore reduced. In addition, since article-holding component 1 is covered by another part of the vehicle, the appearance of the interior of the vehicle is not degraded. Furthermore, article-holding component 1 can be used to hold various articles 2 by forming article-holding component 1 in a shape and size that can house various articles 2 to be held that have common shape and size.

Therefore, it is possible to obtain article-holding component 1 that can be used to hold various articles while reducing an increase in cost and without detracting from the appearance of the interior design of the vehicle.

Although the invention has been described above in connection with several preferred embodiments thereof, it will be understood by those skilled in the art that these embodiments are provided solely for illustrating the invention and do not limit the scope of the appended claims.

The invention claimed is:

1. An article-holding component for holding an article comprising:
   a cylindrical part made of a cylindrical material, the cylindrical part including a flange;
   a holding part that engages with the article formed on an inner surface of the cylindrical part to enable holding the article;
   an attachment part that is provided on an outer surface of the cylindrical part and that engages with a recessed part formed in a first part of an interior material of a vehicle to allow attachment to and detachment from the first part, wherein:
   the article-holding component is provided in the first part of the interior material of the vehicle;
   the first part is covered with a second part of the vehicle different from the interior material;
   the first part is a side surface of an instrument panel of the vehicle or a side wall of a passenger compartment of the vehicle; and
   a contact part that has a recessed form having a substantially same shape as the flange is formed on an opening side of the recessed part.

2. The article-holding component according to claim 1, wherein a cover part for covering the recessed part can be attached to the recessed part when the article-holding component is not attached.

3. The article-holding component according to claim 1, wherein:
   the holding part comprises two or more convex parts that project toward the inside of the cylindrical part; and
   the convex parts engage with grooves provided on the article.

4. The article-holding component according to claim 2, wherein:
   the attachment part comprises first claw parts; and
   the shape and positions of the first claw parts are the same as those of second claw parts provided on the cover part.

* * * * *